United States Patent [19]

Takahashi

[11] Patent Number: 4,918,725
[45] Date of Patent: Apr. 17, 1990

[54] TERMINAL IMPEDANCE SETTING CIRCUIT FOR A TWO-WIRE TO FOUR-WIRE CONVERTING CIRCUIT

[75] Inventor: Kiyoh Takahashi, Tokyo, Japan

[73] Assignee: NEC Corporation, Japan

[21] Appl. No.: 276,154

[22] Filed: Nov. 23, 1988

[30] Foreign Application Priority Data

Nov. 25, 1987 [JP] Japan .................................. 62-298280

[51] Int. Cl.⁴ ......................... H04M 1/76; H04B 1/66
[52] U.S. Cl. .................................... 379/394; 379/398; 379/345
[58] Field of Search ............... 379/394, 398, 345, 340; 370/32.1

[56] References Cited

U.S. PATENT DOCUMENTS 4,503,289  5/1985  Spires .................................... 379/398
4,791,668  12/1988  Pringle .................................. 379/398

*Primary Examiner*—Stafford D. Schreyer
*Attorney, Agent, or Firm*—Laff, Whitesel, Conte & Saret

[57] ABSTRACT

A terminal impedance setting circuit in a 2- to 4-wire converting circuit allows the characteristic impedance to be changed with accuracy while enhancing a miniaturization of the converting circuit. The impedance setting circuit has a first amplifier for amplifying signals that are incoming over a send pair of a four wire line and are destined for a two wire trunk line. A second amplifier amplifies signals that are incoming over the two wire trunk line and are destined for a receive pair of the four wire line. A resistor network is associated with each of the amplifiers for adjusting the output thereof. A shunt resistance is coupled between an input of the first amplifier and an output of the second amplifier for matching the impedance of the two wire trunk line. A semiconductor switch adjusts the resistances of the resistor networks and the shunt resistance in response to an external command.

12 Claims, 6 Drawing Sheets

TERMINAL IMPEDANCE SETTING CIRCUIT FOR A TWO-WIRE TO FOUR-WIRE CONVERTING CIRCUIT

BACKGROUND OF THE INVENTION

1. Field of the Invention

The present invention relates to a terminal impedance setting circuit installed in a two-wire to four-wire (hereunder referred to as "2 to 4") converting circuit which is connected between a telephone exchange and a two-wire trunk line (or a central office line) leading to an opposite exchange system and which may have any of various kinds of characteristic impedance.

2. Description of the Prior Art

In a prior art 2 to 4 converting circuit, of the type described, a transformer is connectable to a two-wire trunk line which is provided with, for example, a 600 ohms/900 ohms switching terminal. The terminal allows either 600 ohms or 900 ohms to be selected by an operator in order to set up a terminal impedance which matches a particular characteristic of a trunk line to which the transformer is connected. In another prior art 2 to 4 converting circuit, a switch circuit is installed to automatically select either 600 ohms or 900 ohms in response to a control signal which is fed thereto from a central control circuit of an exchange system.

A reference is made to FIG. 1 for discussing such a prior art 2 to 4 converting circuit. In the drawing, a 2 to 4 converting circuit 80 connects a two-wire trunk line 50 to a four-wire analog/digital (A/D) converter 60, while matching the the impedance of the trunk to the impedance of the converter, i.e. 600 ohms or 900 ohms.

The converting circuit 80 is controlled by a central control circuit 70 of an exchange system. The converting circuit 80 includes a transformer 81, a switch 82, operational amplifiers 12 and 13, a resistor 100, and an echo canceller 83. The transformer 81 has one winding connecting to the trunk line 50. The other transformer winding is connected to the switch 82 at two terminals 811 and 812 thereof. The terminals 811 and 812 are respectively matched to 600 ohms and 900 ohms which are the characteristic impedance available with the trunk line 50.

In response to a command from the central control circuit 70, the switch 82 selects either one of the matching terminals 811 and 812 and connects it to the trunk line 50. In this instance, the difference of impedance value is dependent upon the number of turns of the transformer 81. The four-wire side of the switch 82 receives an output of the A/D converter 60 via the amplifier 12 and sends it to the trunk line 50. Further, the four-wire side of the switch 82 is connected to the input side of the A/D converter 60 via the amplifier 13 to deliver a signal which is coming in over the trunk line 50.

The switch 82 is implemented by an electromagnetic relay, for example. The connections are made to the terminals which are operated by a mechanical contact. The echo canceller 83 estimates an amount of feed back from the output of the amplifier 12 to the amplifier 13 and subtracts a signal component associated with the feed back from an output of the amplifier 13, in order to eliminate the feed back of speech.

A drawback with such a prior art construction is that one of the two windings of the transformer 81 has to be provided with an many as three terminals. This, coupled with the fact that the switch 82 is implemented by a mechanical relay, increases the overall size of the circuitry.

To eliminate the above described problem, switch 82 may be a semiconductor device. However, this kind of scheme is not practical for the following reason. A semiconductor switch generally has an imprecise internal conduction resistance value which is scattered over a substantial range of 50 ohms to 200 ohms. The resistance value of the resistor 100 usually lies in the range of 400 ohms to 600 ohms, which is a relatively low load impedance. Due to such a scattering of the conduction resistance of a semiconductor switch, the impedance produced by the resistor 100 and transformer 81 is not matched to the impedance of the trunk line 50.

SUMMARY OF THE INVENTION

It is, therefore, an object of the present invention to provide a terminal impedance setting circuit which is installed in a 2 to 4 converting circuit connected to a trunk line and which allows the characteristic impedance to be changed over with accuracy, while enhancing the miniaturization of the entire converting circuit.

The inventive terminal impedance setting circuit is installed in a 2 to 4 converting circuit which accommodates a two-wire trunk line. The terminal impedance setting circuit is connected to an A/D converter which converts back and forth between an analog signal transmitted over the trunk line and a digital signal propagated in an exchange. The terminal impedance sets circuit setting a terminal impedance which is matched with a characteristic impedance of the trunk line.

The circuit of the invention comprises:

a DC (direct current) blocking section connected to the trunk line for blocking a DC component while passing an AC (alternating current) component;

a first amplifier for amplifying an analog output signal of the A/D converter and sending the resulting amplified signal to the trunk line via the DC blocking section;

a second amplifier for receiving and amplifying an input received over the trunk line via the DC blocking section and delivering the resulting amplified input to an analog input terminal of the A/D converter;

a series-connected resistor connected serially between the first amplifier and the analog output of the A/D converter;

a plurality of shunt resistors connected between an input terminal of the first amplifier and an output terminal of the second amplifier and having predetermined resistance values, each of the resistance values being associated with a respective one of a plurality of different kinds of characteristic impedance which are presumed to apply to the trunk line, the shunt resistors individually constituting a voltage dividing circuit with the series-connected resistor;

a first semiconductor switch for selecting any of the plurality of kinds of shunt resistors in response to a command for setting a terminal impedance value given externally so as to set up the voltage dividing circuit;

negative feedback circuits each being associated with the first amplifier and second amplifier and each having a plurality of kinds of ground resistors, each of the ground resistors having a particular resistance value associated with a respective one of the characteristic impedance values of the trunk line; and at least one second semiconductor switch for selecting a combination of the ground resistors in response to said command given externally and for forming a ground resistance value associated with the characteristic impedance of the trunk line.

The first semiconductor switch and second semiconductor switch are operated, in response to said command given externally, which is representative of any of the plurality of kinds of characteristic impedance of the trunk line so as to produce a terminal impedance matching the characteristic impedance of the trunk line.

BRIEF DESCRIPTION OF THE DRAWINGS

The above and other objects, features and advantages of the present invention will become more apparent from the following detailed description when taken with the accompanying drawings in which.

In these drawings, the same reference numerals are individually representative of the same structural elements.

DETAILED DESCRIPTION OF THE PREFERRED EMBODIMENTS

Figure 1:
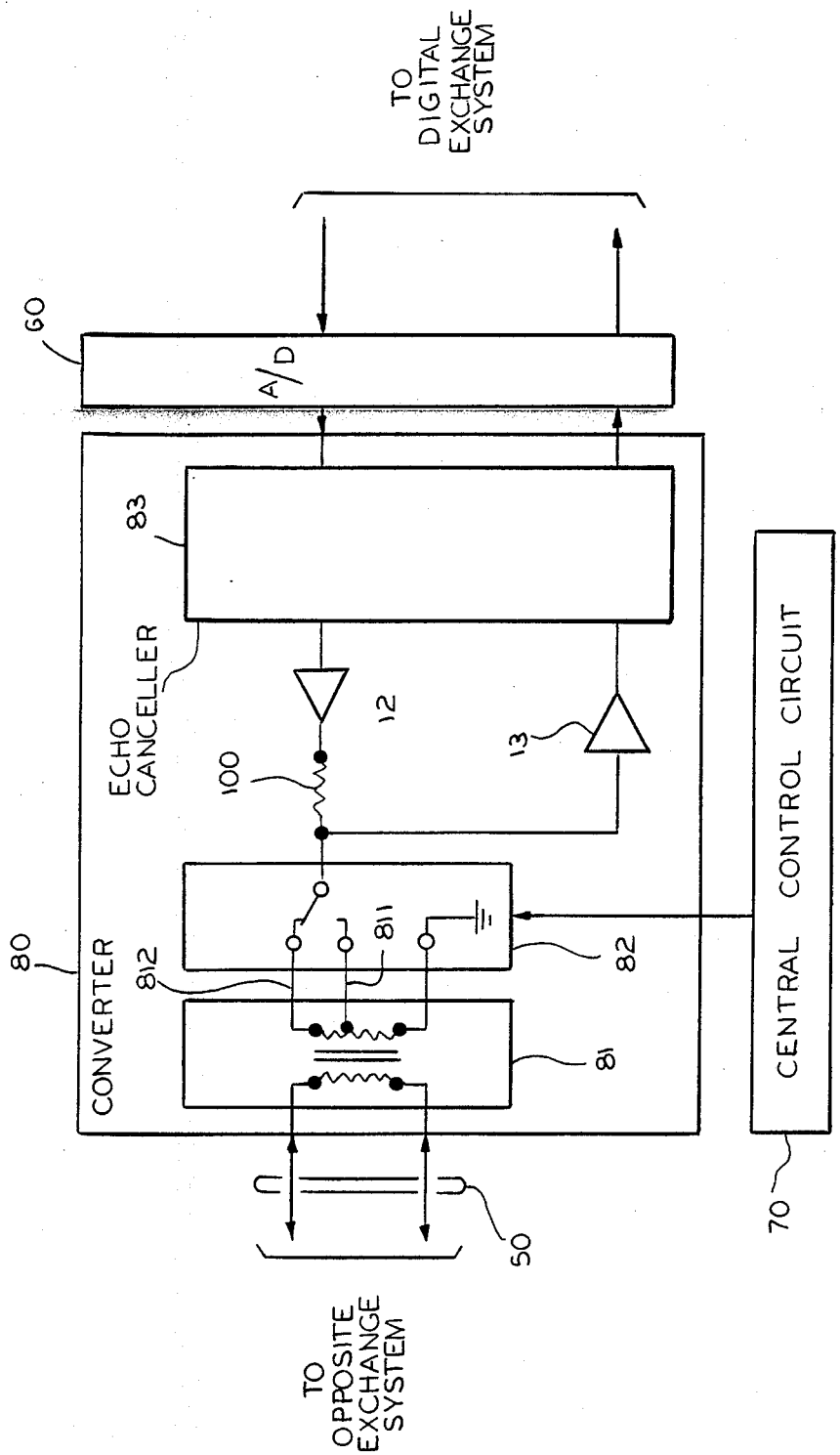
FIG. 1 is a diagram schematically showing a prior art 2 to 4 converting circuit.
Figure 2:
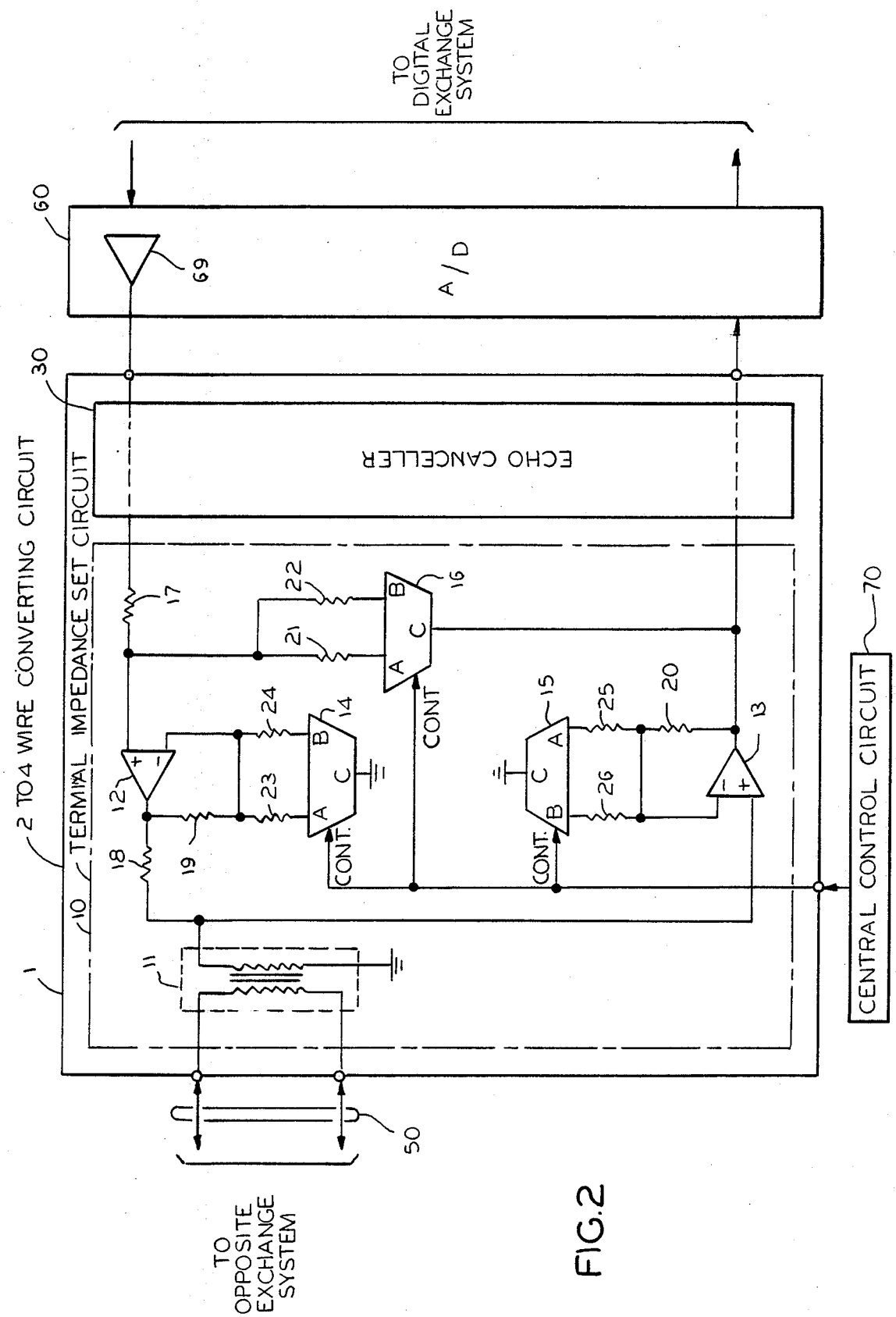
FIG. 2 is a diagram schematically showing an embodiment of the present invention.

Referring to FIG. 2 of the drawings, a 2 to 4 converting circuit in accordance with one embodiment of the present invention is shown and generally designated by the reference numeral 1. As shown, the converting circuit 1 generally comprises a terminal impedance setting circuit 10 and an echo canceller 30. The circuit 10 is connected to a trunk line 50 which is in turn connected to another exchange system. On the other hand, the circuiit 30 is connected to an analog/digital (A/D) converter 60 of a digital exchange system.

The terminal impedance setting circuit 10 receives a control signal CONT in the form of terminal impedance setting data (e.g. the signal provides a distinction between 600 ohms and 900 ohms) from a central control circuit 70 of the digital exchange system. Circuit 10 matches the terminal impedance to the characteristic impedance of the trunk line (two-wire) 50. The circuit 10 is made up of a transformer 11, operational amplifiers 12 and 13, electronic switches 14, 15 and 16, and resistors 17 to 26.

Serving to block a DC (direct current) component, the transformer 11 has one winding connecting to the two wires of the trunk line 50 and the other winding connecting to ground at one terminal and to an input/output circuit at the other terminal. The input/output circuit is connected to the A/D converter 60.

A transmission path from the A/D converter 60 to the trunk line 50 extends through the echo canceller 30, series-connected resistor 17, positive (+) input terminal of the amplifier 12, resistor 18, and transformer 11, in this order.

A reception path from the trunk line 50 to the A/D converter 60 extends through the transformer 11, positive input terminal of the amplifier 13, and echo canceller 30, in this sequence. The resistor 17 and the positive input terminal of the amplifier 12 are connected to one terminal of two shunt resistors 21 and 22. The other terminal of the resistor 21 is connected to a select terminal A of the switch 16 while the other terminal of the resistor 22 is connected to a select terminal B of the switch 16. A common terminal C of the switch 16 is coupled to an output terminal of the amplifier 13.

A negative (−) input terminal and an output terminal of the amplifier 12 are interconnected via the feedback resistor 19. Connected to the negative input terminal of the amplifier 12 are one terminal of the ground resistor 23 and one terminal of the ground resistor 24. The other terminal of the resistor 23 and the other terminal of the resistor 24 are connected to select terminals A and B of the switch 14, respectively. The switch 14 has a common terminal C which is connected to ground.

The amplifier 13 has a negative input terminal and an output terminal which are interconnected via the feedback resistor 20. The negative input terminal of the amplifier 13 is further connected to one terminal of the ground resistors 25 and 26. The other terminal of the ground resistor 25 and the other terminal of the ground resistor 26 are connected to select terminals A and B of the switch 15, respectively. A common terminal C of the switch 15 is connected to ground.

Implemented by a semiconductor switch, each of the switches 14, 15 and 16 connects the common terminal C thereof to one of the two select terminals A and B in response to the control signal CONT which is fed from the central control circuit 70 and which is indicative of the kind of characteristic impedance (600 ohms or 900 ohms) that is required for the trunk line 50.

Figure 3:
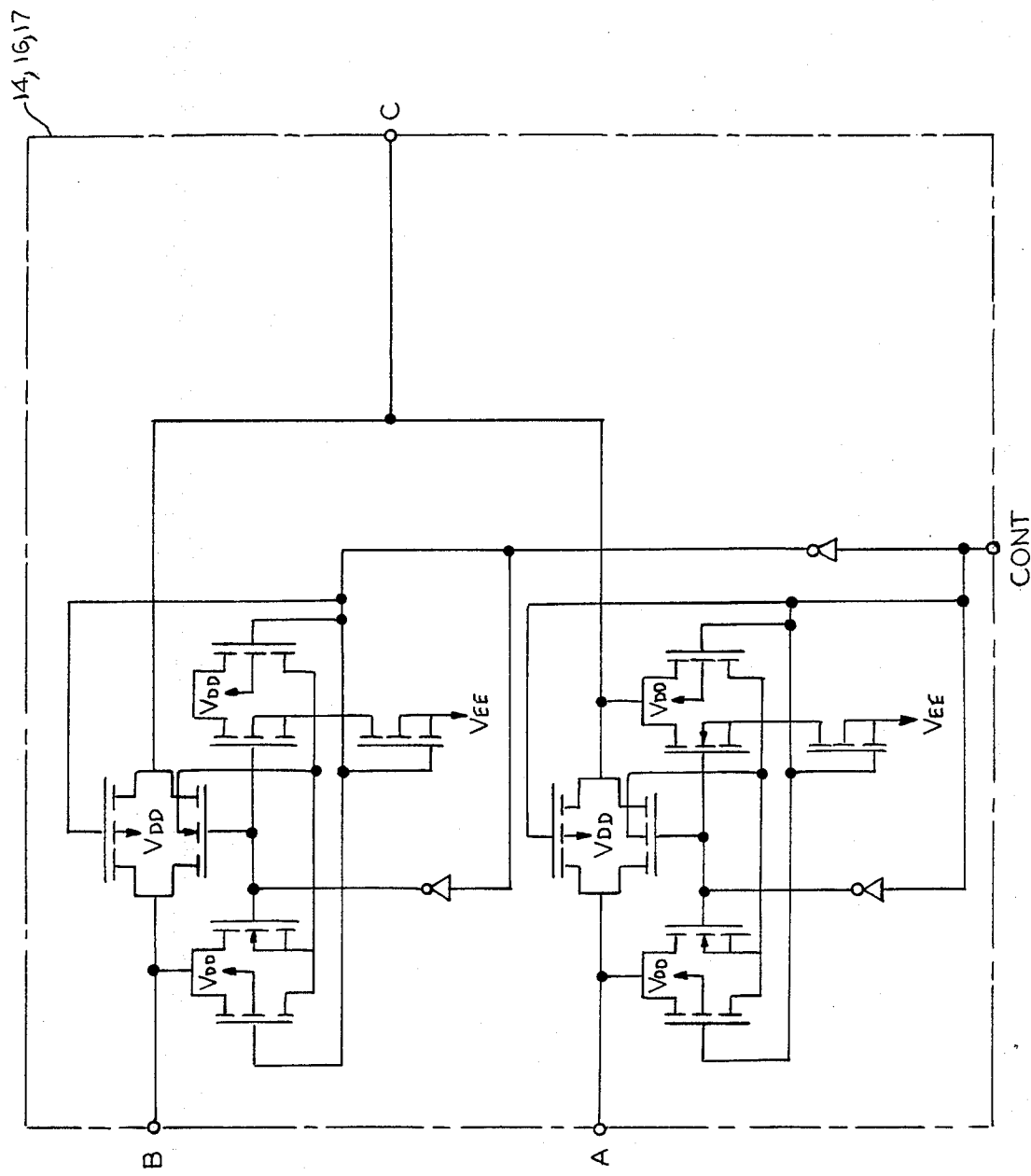
FIG. 3 is a diagram showing a part of the circuit of FIG. 2 in detail.

Such a semiconductor switch may be comprised of an analog switch which is made of either CMOS transistors as shown in FIG. 3 or FETs by way of example. In the specific construction shown in FIG. 3, when a high level or "H" signal is applied to a switch control terminal CONT, the common terminal C is brought into a connection with the select terminal B and is switched out of connection with the select terminal A.

The A/D converter 60 (FIG. 2) delivers an analog output thereof to the resistor 17 of the converting circuit 1 via an amplifier 69 with an internal impedance of substantially zero ohms.

Figure 4:
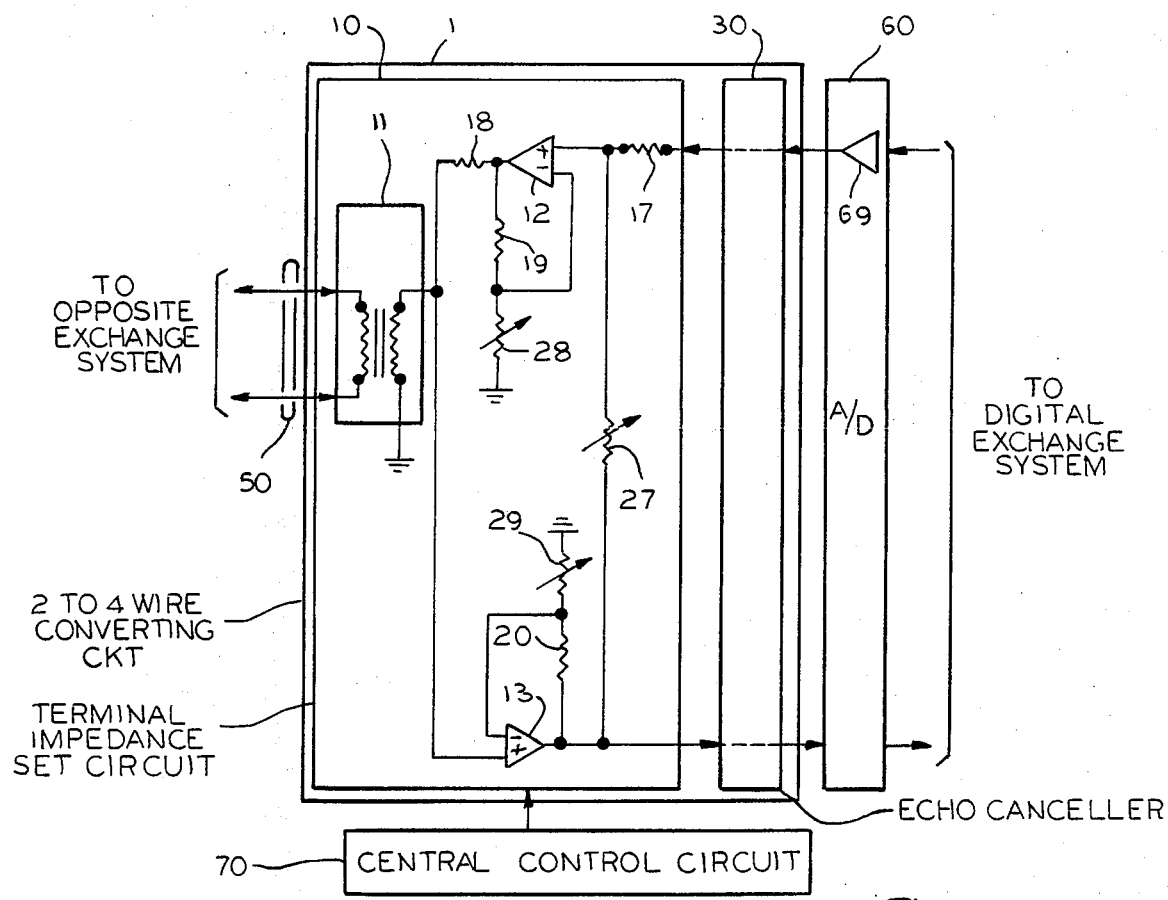
FIG. 4 is a diagram showing an equivalent circuit which is useful for understanding the construction and operation of the circuit shown in FIG. 2.

Referring to FIG. 4, an equivalent circuit is shown and the three switch sections shown in FIG. 2 are individually replaced with variable resistors. In FIG. 4, a variable resistor 27 is constituted by the resistors 21 and 22 and is switch 16 of FIG. 2 and controlled to have a resistance value which matches with the characteristic impedance of a 600 ohms trunk 50 or 900 ohms. Likewise, variable resistors 28 and 29 are respectively constituted by the ground resistors 23 and 24, ground resistors 25 and 26, and switches 14 and 15 which are respectively connected to the resistors 23 and 24 and the resistors 25 and 26. The variable resistors 28 and 29 are controlled in the same manner as the variable resistor 27 with respect to the resistance value.

Figure 5:
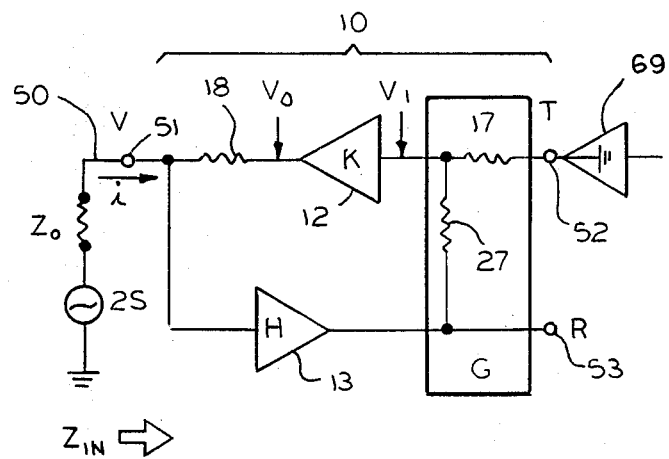
FIG. 5 is a diagram illustrating the principle of setting of various numerical values associated with FIG. 2.

A reference will be made to FIG. 5 for describing a specific mathematical procedure for determining various numerical values on which the resistance values are based. More specifically, FIG. 5 is a circuit diagram which is exemplarily, showing a basic circuit which is adapted for the design of such numerical values. In FIG. 5, one terminal of the resistor 18 and the input terminal of the amplifier 13 of the circuit 10 are connected to a terminal 51. The other terminal of the resistor 18 is connected to the output terminal of the amplifier 12. The input terminal of the amplifier 12 and the output terminal of the amplifier 13 are interconnected via the resistor 27. The input terminal of the amplifier 12 is further connected to a terminal 52 via the resistor 17. The terminal 52 is in turn connected to the output terminal of the amplifier 69 of the A/D converter 60 (FIG. 2). Looking into the amplifier 69 from the terminal 52, the impedance is substantially zero. The output terminal of the amplifier 13 is further connected to a terminal 53. Looking into the right-hand side (the circuit 10 side) from the terminal 51, a feedback loop is set up by the amplifier 13, resistors 27 and 17, amplifier 12, and resistor 18.

Assume that the amplifiers 12 and 13 have respectively transfer factors K and H (i.e. amplification ratio=output/input), and that the transfer factor G applies to the feedback circuit constituted by the resistors 17 and 27 which form a voltage dividing circuit G. Further, assuming that the resistors 17, 18 and 27 have the respectively resistance values of R17, R18 and R27, the transfer factor G is calculated by R17/(R17+R27).

When the input to the amplifier 13, as measured at the terminal 51, and the output voltage from the amplifier 12 are respectively assumed to be V and Vo, the internal impedance Zin looking into the circuit 10 side, from the terminal 51, is expressed as:

$$Zin = \frac{V}{i} = -V \cdot \frac{R18}{V - Vo} = \frac{R18}{1 - (Vo/V)}$$

because an input impedance of the amplifier 13 is so large that an input current to the amplifier 13 is nearly zero.

On the other hand, from $Vo = V \cdot H \cdot G \cdot K$, $$Vo/V = H \cdot G \cdot K$$
Hence,
$$Zin = \frac{R18}{1 - H \cdot G \cdot K} \qquad \text{Eq. (1)}$$

Assuming that the trunk line 50 has a characteristic impedance of Zo and the transmission voltage is 2S, the voltage level R on the receive terminal 53 is produced by:

$$V = 2S \cdot \frac{Zin}{Zo + Zin}$$
$$= 2S \cdot \frac{R18/(1 - H \cdot G \cdot K)}{Zo + R18/(1 - H \cdot G \cdot K)}$$
$$= 2S \cdot \frac{R18}{R18 + Zo(1 - H \cdot G \cdot K)}$$

Therefore, $$R = H \cdot V = \frac{2S \cdot H \cdot R18}{R18 + Zo(1 - H \cdot G \cdot K)} \qquad \text{Eq. (2)}$$

Further, assuming that the input to the amplifier 12 is V1, when a level T on the transmit terminal 52 is transmitted to the trunk line 50, V and T are related as represented by an equation (3):

$$V = Vo \cdot \frac{Zo}{R18 + Zo}$$

On the other hand, $$V1 = \frac{H \cdot V \cdot R17 + T \cdot R27}{R17 + R27}$$
$$= \frac{R17}{R17 + R27} \cdot H \cdot V + \frac{R27}{R17 + R27} \cdot T$$
$$= G \cdot H \cdot V + (1 - G) \cdot T$$
$$Vo = K \cdot V1 = K[G \cdot H \cdot V + (1 - G) \cdot T]$$
Hence, $$V = K[G \cdot H \cdot V + (1 - G) \cdot T] \cdot \frac{Ro}{R18 + Zo} \qquad \text{Eq. (3)}$$
$$= \frac{K \cdot (1 - G) \cdot Zo}{R18 + Zo(1 - K \cdot G \cdot H)} \cdot T$$

In the above equation, 2S is representative of a signal source of the distant or counter-exchange which is located at the other end of the trunk line 50. When a signal is transmitted at the voltage 2S, a signal appears on the receive terminal 53 of the circuit 10 as follows:

$$2S \cdot \frac{Zin}{Zo + Zin} = 2S \cdot \frac{Zo}{Zo + Zo} = S$$

As for level setting for the conversion of an analog signal to a digital signal, assuming that the maximum dynamic range of the transmission system is 3.17 dBm (decibels above 1 milliwatt) as defined by the CCITT (International Telegraph and Telephone Consultive Committee) standards, 2S is 3.156 volts for the Zo=600 ohm system and 3.8652 volts for the Zo=900 ohm system. In this case, the constants of the transfer factors H, G and K are determined such that the level R equals the maximum dynamic range ($\pm 2.5$ volt) of the A/D converter 60.

As for level setting associated with the conversion of a digital signal into an analog signal, when the maximum dynamic range of the transmission system is 3.17 dBm, the voltage V across the impedance Zo is 1.578 volts (=S) for the 600 ohm system and 1.9326 volts for the 900 ohm system. Specifically, assume that R18 is 400 ohms, and that Zin (=Zo) is 600 for the 600 ohm system and 900 for the 900 ohm system. Then, the three transfer factors H, G and K can be determined by adopting the previously mentioned Eqs. (1), (2) and (3). The parallel resistance values necessary for the amplifiers 12 and 13 and voltage dividing circuit and, therefore, the resistance values of the shunt and ground resistors which are connected to the individual switches can be calculated on the basis of the transfer factors H, G and K.

For example, assume that the amplifier 12 has transfer factors K1 and K2 for Zo=600 ohms and Zo=900 ohms, respectively, as determined by the above equations. Then, the resistance values R19, R23 and R24 of the resistors 19, 23 and 24 should only be selected to saitsfy the following equations:

$$K1 = \frac{R23 + R19}{R23}, K2 = \frac{R24 + R19}{R24}$$

In this condition, the switch 14 (FIG. 2) is operated to connect the select terminal A to the common terminal C when Zo=600 ohms is specified and to connect the select terminal B to the common terminal C when Zo=900 ohms is specified.

Since the resistance values R23 and R24 produced by the mathematical procedure may be greater than 50 kilohms, the irregularity of the internal resistance of 100 ohms to 200 ohms particular to the serially connected semiconductor switch 14 is negligible in the event of the setting characteristic impedance. This is true with the other switches 15 and 16 also.

Figure 6:
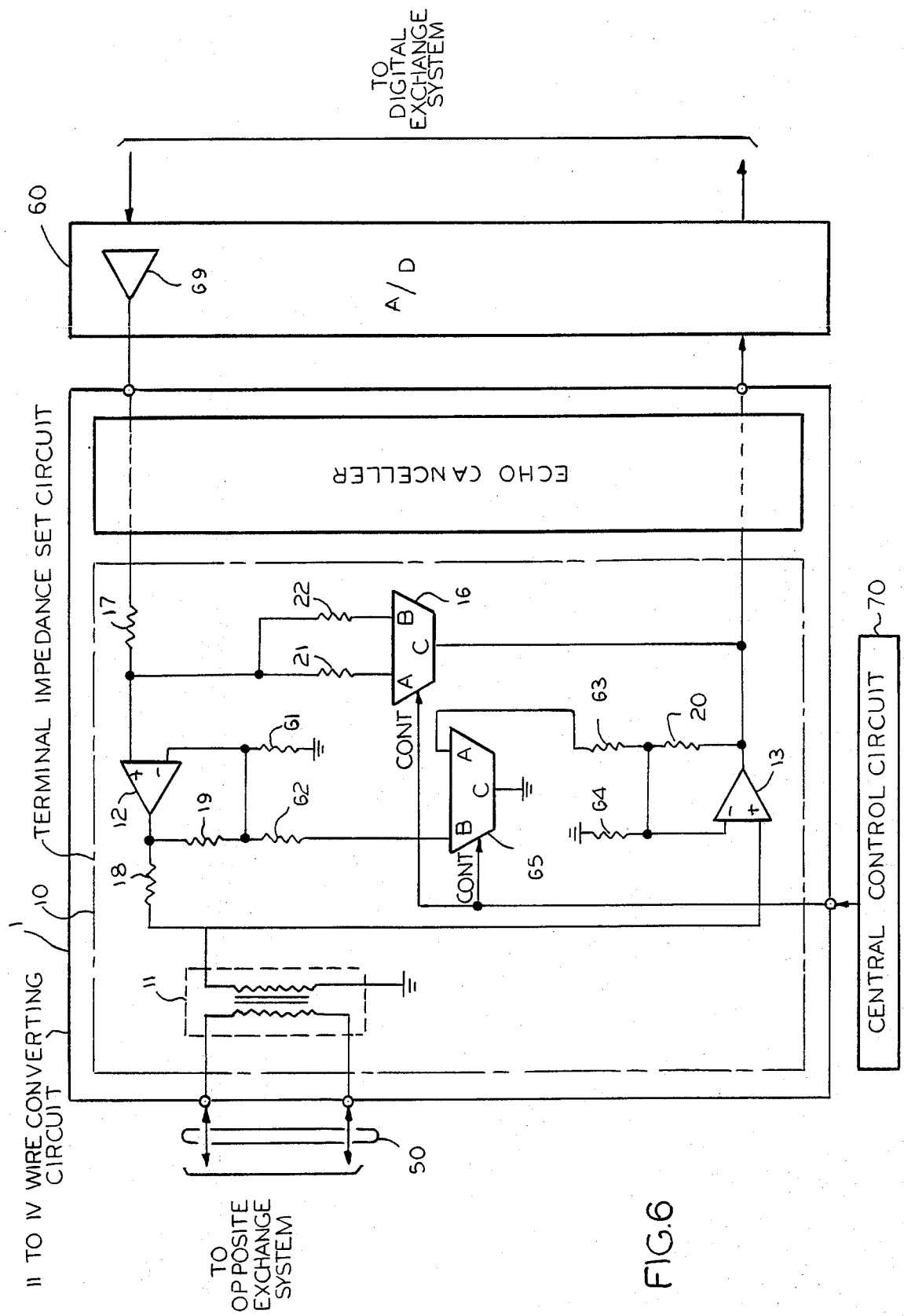
FIG. 6 is a diagram showng another embodiment of the present invention.

Referring to FIG. 6, another embodiment of the invention is shown. In FIG. 2, the resistors 23 and 24 and the resistors 25 and 26 associated with the amplifiers 12 and 13, respectively, are selectively connected to ground by the switches 14 and 15.

In the embodiment shown in FIG. 6, a ground resistor 61 associated with the amplifier 12 together with another ground resistor 62 is directly connected to ground to define the designed resistance value for Zin=600 ohms. The parallel resistance value of the two resistors 61 and 62 is selected to be the designed resistance value for Zin=900 ohms. As for the amplifier 13, a ground resistor 64 is directly connected to ground as a designed resistance value for Zin=900 ohms. The parallel resistance R634 of the two resistors 63 and 64 is selected to be the designed resistance value for Zin=600 ohms. The ground resistors 62 and 63 are connected to select terminals A and B of an electronic switch 65. The common terminal C of the switch 65 is connected to ground.

The switch 65 is actuated by a control signal or command fed thereto from the central control circuit 70. More specifically, when Zin is 600 ohms, only the terminals A and C of the switch 65 are interconnected so that the transfer factor K of the amplifier 12 becomes (R61+R19)/R61 and the transfer factor H of the amplifier 13 becomes (R634+R20)/R634. With this particular embodiment, it is possible to replace the two switches 14 and 15 shown in FIG. 2 with a single switch 65.

Strictly speaking, the calculation of the transfer factors H, G and K discussed above is performed by taking account of the losses of the transformer, DC loop, etc.

While the DC blocking section has been shown and described as being implemented by the transformer 11, it may alternatively be constituted by a semiconductor device.

As regards the switching of semiconductor switches, in the case where a plurality of trunk lines having the same characteristic impedance are connected to a plurality of 2 to 4 convering circuits which are accommodated in a single package, commands to the switches may be collectively delivered to the converting circuits on a backage basis. The central control circuit which feeds such commands to the switches may be implemented by a central processor of an exchange or a processor adapted to control a package which is loaded with a trunk line accommodating circuit. The above-mentioned embodiments does not include any mechanically operated devices and is therefore far higher in reliability than a mechanical circuit arrangement.

Figure 7:
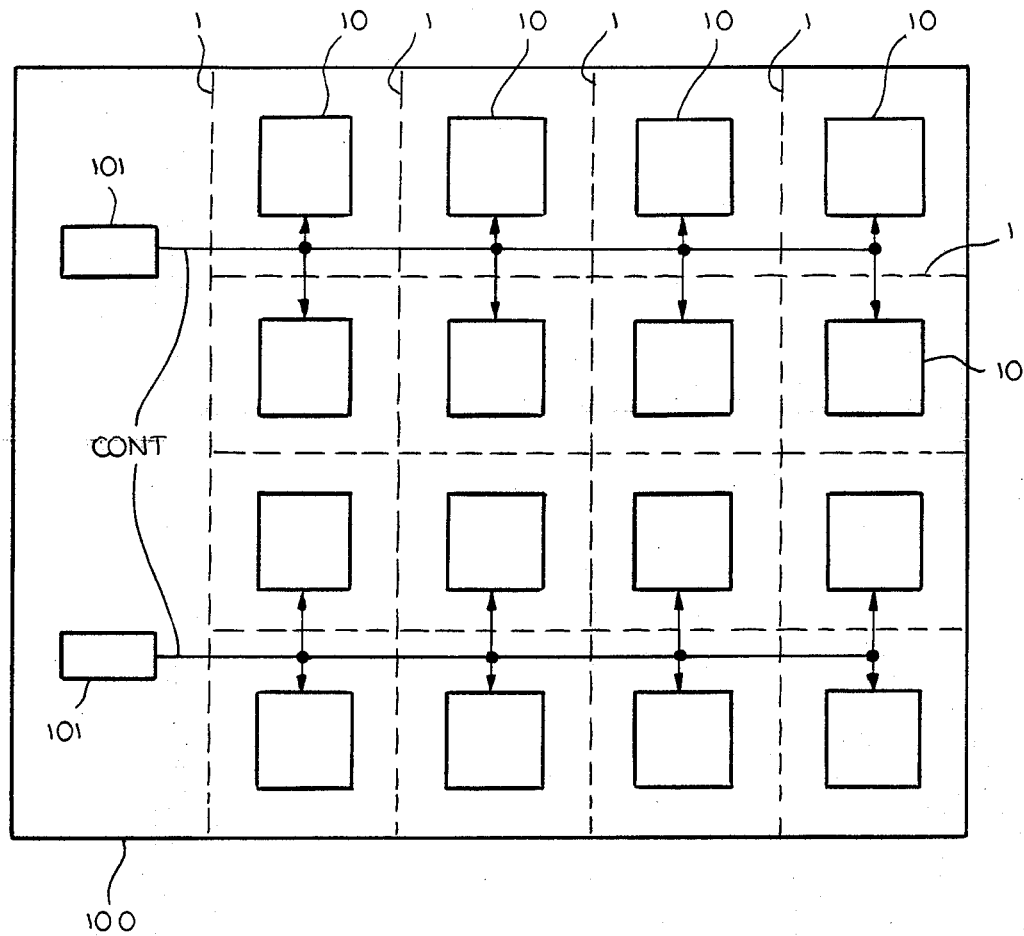
FIG. 7 is a diagram showing a modified form of the embodiments.

As shown in FIG. 7, a plurality of 2 to 4 converting circuits 1 may be provided in a single package 100. In this case, use made be made of dip switches or key switches 101 for simultaneously delivering an impedance set command to the impedance selecting switches 14 to 16 of the circuits 1. An advantage attainable with such an arrangement is that the impedance of a plurality of 2 to 4 converting circuits can be changed over by a single operation for a plurality of trunk lines which will have the same impedance.

While the load impedance of a trunk line is assumed to be 600 ohms and 900 ohms in the embodiments, the resistance values of the resistors can be calculated in the same manner and switches each having a predetermined number of select terminals can be used with any other impedance values.

In summary, in accordance with the present invention, the terminal impedance of a trunk line can be set stably all the time. In addition, the switching construction is implemented by a semiconductor circuit which contributes a great deal to the miniaturization of the entire circuitry. This unprecedented advantage is achieved by calculating the transfer factors of two amplifiers and the transfer factor of a single voltage dividing circuit in association with each of a plurality of kinds of characteristic impedance so that one resistance value of each circuit, i.e., the ground resistance of a feedback circuit of each resistor and a split resistor of the voltage dividing circuit may be individually usable to any of a plurality of high resistance values, and delivering a command to semiconductor switches for selecting any of such resistance values.

What is claimed is:

1. A terminal impedance setting circuit in a two-wire to four-wire converting circuit which accommodates a two-wire trunk line and which is connected to an analog/digital converter which converts back and forth between an analog signal transmitted over said trunk line and a digital signal propagated in an exchange, said terminal impedance setting circuit setting a terminal impedance which matches a characteristic impedance of said trunk line, said terminal impedance setting circuit comprising:

a DC blocking section connected to said trunk line for blocking a direct current component while passing an alternating current component;

a first amplifier for amplifying an analog output signal of said analog/digital convertr and sending the resulting amplified signal to said trunk line via said DC blocking section;

a second amplifier for receiving and amplifying an input received over said trunk line via said DC blocking section an for delivering the resulting amplified signal to an analog input terminal of said analog/digital converter;

a series-connected resistor connected serially between said first amplifier and said analog output of said analog/digital converter;

a plurality of shunt resistors connected between an input terminal of said first amplifier and an output terminal of said second amplifier and having predetermined resistance values, each of said resistance values being associated with a respective one of a plurality of kinds of characteristic impedances which are presumed with said trunk line, said shunt resistors individually constituting a voltage dividing circuit with said series-connected resistor;

a first semiconductor switch for selecting any of the plurality of kinds of shunt resistors in response to a command for setting a terminal impedance value given externally so as to set up said voltage dividing circuit;

negative feedback circuits each being associated with said first amplifier and with said second amplifier, each of said negative feedback circuits having a plurality of different kinds of ground resistors each of which has a particular resistance value associated with a respective one of the characteristic impedance values of said trunk line; and at least one second semiconductor switch for selecting a combination of the ground resistors in response to said command which is given externally and for forming a ground resistance value associated with the characteristic impedance of the trunk line;

said first semiconductor switch and said second semiconductor switch being operated, in response to said command given externally, which is representative of any of the plurality of kinds of characteristic impedance of said trunk line so as to produce a terminal impedance matching with the characteristic impedance of said trunk line.

2. A terminal impedance setting circuit as claimed in claim 1, wherein said second semiconductor switch comprises two semiconductor switches for individually and selectively connecting to ground the plurality of ground resistors of said two feedback circuits which are individually associated with said first amplifier and said second amplifier, said first semiconductor switch and said second semiconductor switches being operatively associated to set up any of the plurality of kinds of terminal impedance.

3. A terminal impedance setting circuit as claimed in claim 1, wherein each of said feedback circuits associated with said first amplifier and said second amplifier has one ground resistor which is permanently connected to ground and another ground resistor which is connected to a respective one of select terminals of said second semiconductor switch, whereby two kinds of terminal impedance are selectively set up.

4. A terminal impedance setting circuit as claimed in claim 1, wherein a plurality of said two-wire to four-wire converting circuits and at least one manual switch are mounted on a single electronic circuit package, and said manual switch being operable to set up terminal impedance of said two-wire to four-wire converting circuits at the same time.

5. A two to four wire terminal for matching the impedance of a two wire trunk line to a four wire line, said terminal comprising first amplifying means for amplifying signals that are incoming over a send pair of a four wire line and are destined for a two wire trunk line, second amplifier means for amplifying signals that are incoming over said two wire trunk line and destined for a receive pair of said four wire line, a resistor network associated with each of said amplifier means for adjusting the output thereof, shunt resistance means coupled between an input of said first amplifier and an output of said second amplifier for matching the impedance of said two wire trunk line, semiconductor switch means for adjusting the resistances of said resistor networks and said shunt resistance means, and external command means for operating said semiconductor switch means in response to a presumed characteristic of said two wire trunk.

6. The impedance matching terminal of claim 5 wherein there are at least two of said electronic switch means, and said shunt resistance means comprises at least two resistors connected in parallel, and at least one of said electronic switching being connected to select at least one of said two shunt resistors.

7. The impedance matching terminal of claim 5 wherein there are a plurality of said semiconductor switch means, each of said networks comprises a feed back resistor for an associated amplifier and a plurality of alternative resistors for connection to said feedback resistor to form alternative voltage dividers responsive to an operation of one of said semiconductor switch means associated with the network being controlled.

8. The impedance matching terminal of claim 7 wherein a first of said plurality of semiconductor switches is associated with said shunt resistance means, said shunt resistance means comprising plurality of resistors connected in parallel, and means responsive to a selective operation of said first semiconductor switches for selecting one of said parallel resistors in accordance with said presumed characteristic of said two wire trunk.

9. The impedance matching terminal of claim 8 and a series resistor coupled between an imput of said first amplifying means and said send pair of said four wire line, said series resistor cooperating with the selected one of said parallel resistors to form a voltage divider.

10. The impedance matching terminal of claim 7 wherein there are three of said semiconductor switches means, two of said semiconductor switch means being respectively individually associated with said resistor networks associated with said two amplifier means, and a third of said of said semiconductor switch means being individually associated with said shunt resistance means.

11. The impedance matching terminal of claim 7 wherein there are two of said semiconductor switch means, one of said switch means controlling two of said resistor networks individually associated with said two amplifier means, and the other of said switch means controlling said shunt resistance means.

12. A two to four wire terminal for matching the impedance of a two wire trunk line, said terminal comprising first amplifying means for amplifying signals that are incoming over a send pair of a four wire line and destined for a two wire trunk, second amplifier means for amplifying signals that are incoming over said two wire trunk and destined for a receive pair of said four wire line, a resistor network including at least one adjustable resistor associated with each of said amplifier means for adjusting the output thereof, shunt resistance means including at least one adjustable resistor coupled between an input of said first amplifier and an output of said second amplifier for matching the impedance of said two wire trunk, and external command means for adjusting said adjustable means in response to a presumed characteristic of said two wire trunk.

* * * * *